US010601605B2

(12) United States Patent
Ferren

(10) Patent No.: US 10,601,605 B2
(45) Date of Patent: Mar. 24, 2020

(54) SECURE MEETING SPACE WITH AUTOMATICALLY ADAPTIVE CLASSIFICATION LEVELS, AND ASSOCIATED SYSTEMS AND METHODS

(71) Applicant: Applied Minds, LLC, Burbank, CA (US)

(72) Inventor: Bran Ferren, Beverly Hills, CA (US)

(73) Assignee: Applied Minds, LLC, Burbank, CA (US)

( * ) Notice: Subject to any disclaimer, the term of this patent is extended or adjusted under 35 U.S.C. 154(b) by 0 days.

(21) Appl. No.: 15/700,964

(22) Filed: Sep. 11, 2017

(65) Prior Publication Data

US 2019/0081809 A1     Mar. 14, 2019

(51) Int. Cl.
*H04L 12/28* (2006.01)
*E04B 1/74* (2006.01)
*E04B 1/348* (2006.01)
*G07C 9/00* (2020.01)

(52) U.S. Cl.
CPC ........ *H04L 12/282* (2013.01); *E04B 1/34869* (2013.01); *E04B 1/74* (2013.01); *G07C 9/00031* (2013.01); *H04L 12/2818* (2013.01)

(58) Field of Classification Search
CPC .............. H04L 12/282; H04L 12/2818; G07C 9/00031; E04B 1/34869; E04B 1/74
See application file for complete search history.

(56) References Cited

U.S. PATENT DOCUMENTS

| 9,301,100 | B1 * | 3/2016 | Jampani | G01S 5/0278 |
| 9,955,318 | B1 * | 4/2018 | Scheper | H04W 4/043 |
| 2008/0042824 | A1 * | 2/2008 | Kates | G08B 13/183 340/522 |
| 2008/0107274 | A1 * | 5/2008 | Worthy | G06F 21/602 380/278 |
| 2012/0105267 | A1 * | 5/2012 | DeLia | G01S 13/86 342/22 |

(Continued)

OTHER PUBLICATIONS

Privacy Glass/Magic Glass; 'http://glass-manufacturer.weebly.com/privacy-glassmagic-glass.html'; NPL copy obtained Sep. 8, 2017; 4 pages.

*Primary Examiner* — Joshua K Ihezie
(74) *Attorney, Agent, or Firm* — Michael A. Glenn; Perkins Coie LLP

(57) ABSTRACT

Disclosed are meeting spaces that are accessible through an adjoining facility or area, and associated systems and methods that provide automated levels of security for classified discussions. The meeting spaces are configured to automatically adapt to different levels of classification, e.g., from any of unclassified to top secret classifications. The meeting spaces are prevented from becoming active for their intended function until all required security features are activated. In some embodiments, the meeting spaces include one or more electronically opaquing privacy glass windows between the meeting space and the adjoining facility. The privacy glass can either appear as opaque, such as when a classified meeting or call is taking place or as a failsafe mode, or can be optically transmissive, such as when the space is unused, is used for unclassified purposes, and/or when the adjoining area is used at the same or higher level of classification.

14 Claims, 16 Drawing Sheets

(56) References Cited

U.S. PATENT DOCUMENTS

| | | | | |
|---|---|---|---|---|
| 2012/0299728 | A1* | 11/2012 | Kirkpatrick | G06Q 10/109 340/541 |
| 2014/0222206 | A1* | 8/2014 | Mead | B25J 9/1697 700/259 |
| 2014/0253285 | A1* | 9/2014 | Menzel | G07C 9/00023 340/5.7 |
| 2014/0266699 | A1* | 9/2014 | Poder | G08B 25/001 340/539.13 |
| 2014/0379404 | A1* | 12/2014 | Bastide | G06Q 10/1095 705/7.19 |
| 2016/0019736 | A1* | 1/2016 | Radicella | G07C 9/00103 235/382 |
| 2017/0337783 | A1* | 11/2017 | Konecny | G07F 19/205 |
| 2017/0339216 | A1* | 11/2017 | Carlos | H04L 67/10 |
| 2017/0357948 | A1* | 12/2017 | Archer | G06Q 10/1095 |
| 2018/0278605 | A1* | 9/2018 | Fitterer | H04L 63/0861 |

* cited by examiner

US 10,601,605 B2

SECURE MEETING SPACE WITH AUTOMATICALLY ADAPTIVE CLASSIFICATION LEVELS, AND ASSOCIATED SYSTEMS AND METHODS

FIELD OF THE INVENTION

At least one embodiment of the present invention pertains to a secure meeting space, and associated systems and methods, having adaptive classification levels. At least one specific embodiment of the present invention pertains to a secure meeting space that automatically adapts to the classification level of more or more participants.

BACKGROUND

Sensitive compartmented information facilities (SCIFs) are typically enclosed areas that are located within an outer secure area, such as within a building or other stationary or mobile enclosure. SCIFs are commonly used to conduct secure meetings, and/or to exchange classified information, such as for any of military, national security, national defense, or intelligence operations. For instance, SCIFs can be used to process sensitive information or other types of classified information.

Access to SCIFs is typically limited to individual participants that have appropriate security clearances, and/or have otherwise been cleared by authorized security personnel, such that classified information and material is only provided to participants having proper security clearance, and is prevented from presentation, distribution or other dissemination/exposure to unauthorized individuals. As a part of security, personnel entering a SCIF are typically directed to surrender all recording, photographic and other electronic media devices. Activity and conversation inside a SCIF, such as during a secure meeting, is restricted from public disclosure.

While many SCIFs are located within a secure area of an adjoining secure building, some SCIFs can be located in an air, ground or maritime vehicle, or can be established on a temporary basis at a specific site.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
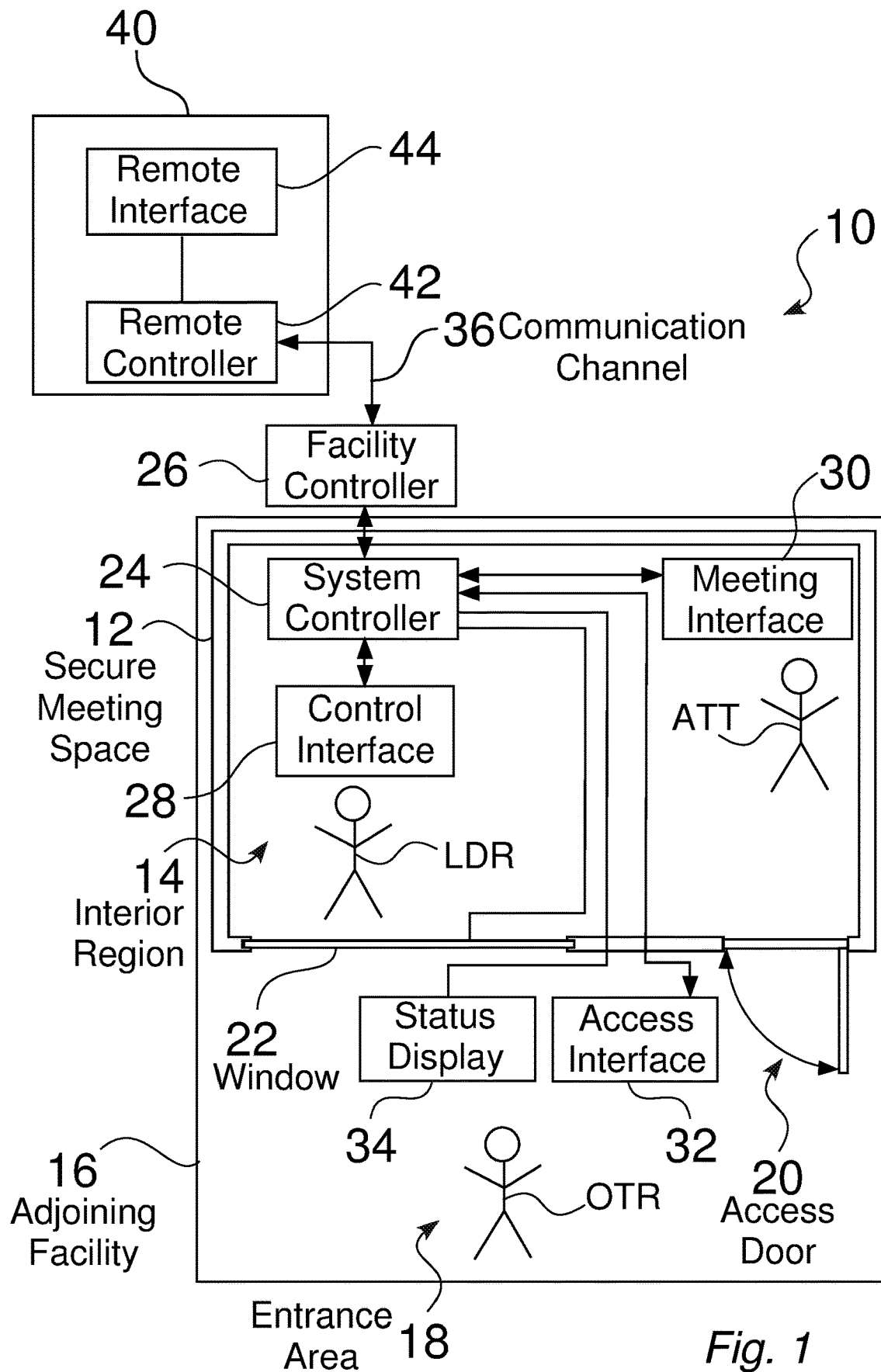
FIG. 1 is a schematic view of an operating environment for an illustrative embodiment of a secure meeting space with automatically adaptive classification levels.

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

Introduced here are meeting spaces, e.g., rooms or pods, that are accessible through an adjoining facility or area, and associated systems and methods that provide automated levels of security for classified discussions. The meeting spaces are configured to automatically adapt to different levels of classification, e.g., from any of unclassified to top secret classifications. In some embodiments, the meeting spaces are prevented from becoming active for their intended function until all required security features are activated.

In some embodiments, the meeting spaces include one or more electronically opaquing privacy glass windows between the meeting space and the adjoining facility, wherein an appearance of the privacy glass windows can be altered between states based on usage criteria as well as meeting parameters. The privacy glass can either appear as opaque, such as, and without limitation, when a classified meeting or call is taking place, or as a failsafe mode, or can be optically transmissive, such as when the space is unused, is used for unclassified purposes, and/or when the adjoining area is used at either the same or higher level of classification. In some embodiments, if the classification level for the adjoining or outer area is lowered below that of an ongoing meeting, the privacy windows automatically become opaque. Furthermore, in some embodiments, a primary and/or lead participant can alter an appearance of the privacy glass windows, via a system controller, based on personal preferences of the primary/lead participant.

In some embodiments, the system does not allow a meeting at higher classification level than the lowest level of clearance of the participants.

In some embodiments, a lead participant can be required to verify the proper security level for all participants that are present, e.g., through touchscreen entry, such as before a meeting is started, before classified materials are provided or displayed to the participants, or before a classified call video teleconference (VTC) is connected.

In some embodiments, the system is configured to detect the presence of all occupants, and to require that the occupants either input their clearance if a badge is not detected, or otherwise be verified by a properly badged user.

In some embodiments, the meeting space can include additional features for onsite and/or offsite functionality. For instance, a door sensor can be connected to the system controller, such that, when the door is opened, the system controller can blank screens and/or momentarily mute a speakerphone or a VTC, while alerting remote participants aurally and visibly that a door at the meeting space is open.

In some embodiments, the door can be locked to outsiders unless a proper level of security identification is provided, e.g., by key card, by security badge, by biometric identification, or by verification by the lead participant.

In some embodiments, the adjoining facility can include a display, banner or ticker to alert outsiders as to the security level of an active meeting, or to inform them that a meeting is in progress.

FIG. 1 is a schematic view of an operating environment 10 for an illustrative embodiment of a secure meeting space 12 e.g., a room or a pod, that includes automatically adaptive classification levels. The illustrative secure meeting space 12 seen in FIG. 1 is accessible through an adjoining facility or area 16, such that the secure meeting space 12 can provide increased security for classified discussions, such as between one or more participants that are located within the meeting space 12, e.g., between a primary or lead participant LDR and one or more participants, i.e., attendees ATT. In some embodiments, a primary and/or lead participant LDR can be one or more participants who set up or initialize meeting parameters. In other embodiments one or more participants may also be designated/assigned as a primary and/or lead participant LDR. In yet another embodiment a primary and/or lead participant can be an organizer of a meeting and not present at the meeting which was organized. In many embodiments, some meeting parameters may include for example, and without limitation, time and date of a meeting, classification level of a meeting, remote sites to participate, names/clearance levels of other participants ATT, projects/topics that may be discussed and/or cleared for discussion in a meeting, and substantially any combination thereof.

Figure 8:
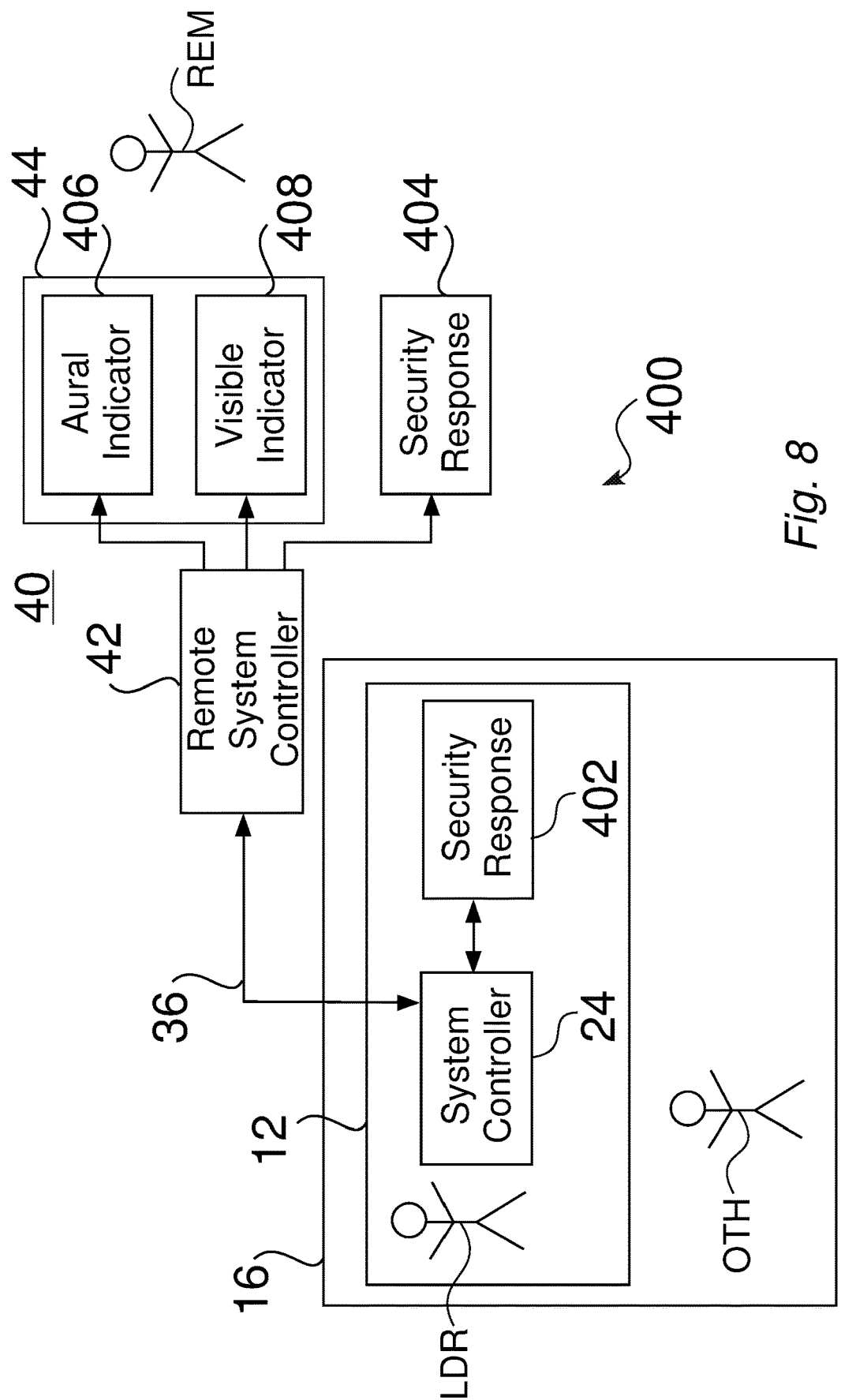
FIG. 8 is a functional schematic diagram showing one or more responses at a remote site as a function of a change in classification level within a secure meeting space.

Some embodiments of the secure meeting space 12 can be networked to provide a secure communication channel 36 to one or more remote locations 40, such as to conduct 106 (FIG. 4, FIG. 10) a secure meeting 612 (FIG. 10) between one or more local participants LDR, ATT, and one or more remote participants REM (FIG. 8).

The illustrative secure meeting space 12 seen in FIG. 1 includes a system controller 24 to provide automated levels of security for classified discussions or meetings, and a corresponding control interface 28, through which one or more participants LDR, ATT can interact with the system controller 24, within the interior region 14 of the secure meeting space 12. Some embodiments of the system controller 24, such as seen in FIG. 1, can communicate or be functionally integrated with a controller 26 that corresponds to the facility 16.

The illustrative secure meeting space 12 seen in FIG. 1 includes an access door 20, through which participants LDR, ATT can enter and exit the secure meeting space 12, e.g., through an entrance area 18, such as upon authorization through an access interface 32. The illustrative access interface 32 seen in FIG. 1 is located in the adjoining facility or area 16, such as to provide controlled access through the access door 20 to the meeting space 12 for authorized participants LDR, ATT. The access door 20 typically includes a lock 70 (FIG. 5) that is linked to the access interface 32 and/or to the system controller 24, such as to prevent access to the secure meeting space 12 from others OTH to are not properly authorized to attend a secure meeting 612. For instance, in some embodiments, the door 20 can be locked to outsiders OTH unless a proper level of security identification is provided, e.g., by key card or security badge 304 (FIG. 7), by biometric identification 306 (FIG. 7), or by verification by a lead participant LDR. In some embodiments, the key card or security badge authorization 304 can include the sensing of radio-frequency information (RFID).

In some embodiments 12, when the users LDR,ATT badge in 304 or are otherwise authorized, the system controller 24 notes their security classification level, e.g., 244d (FIG. 6), such as stored within a meeting log within a memory. In some embodiments 12, the system does not enable a secure meeting at a higher classification level than lowest level of the participants LDR,ATT. In some embodiments 12, the system controller 14 and one or more corresponding sensors 208 (FIG. 5) can detect the presence of occupants LDR,ATT,OTH, and require that they input their clearance, if a badge 304 is not detected. In some embodiments 12, non-badge users ATT can be verified by badged users LDR,ATT.

The secure meeting space 12 can include one or more windows 22, which can include privacy glass 700 (FIG. 1). While the illustrative window 22 seen in FIG. 1 is located on a wall between the meeting space 12 and the facility 16, in some embodiments, the access door 20 can include one or more windows 22, which can similarly include privacy glass 700.

Figure 5:
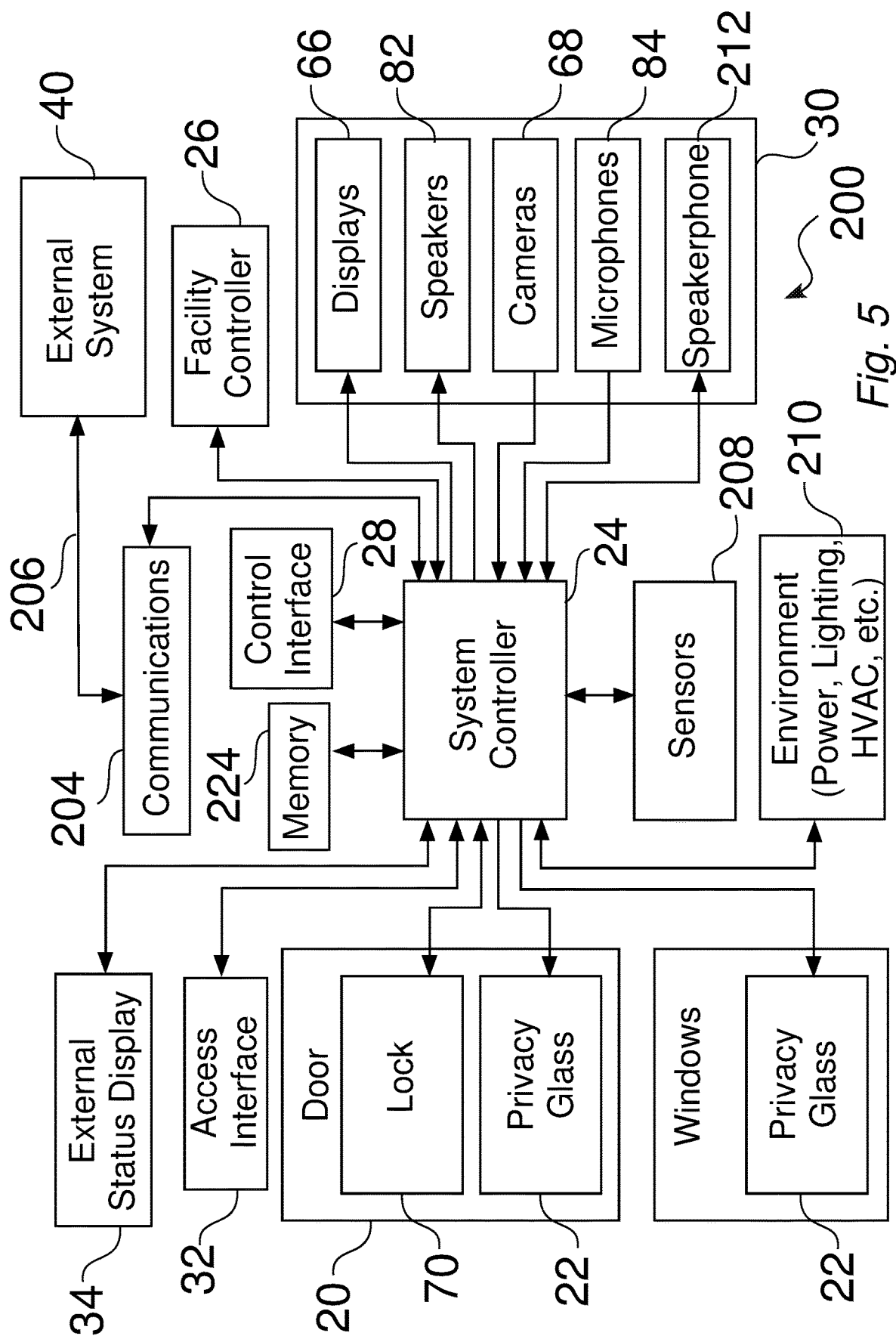
FIG. 5 is a schematic block diagram of components associated with an illustrative embodiment of a secure meeting space with automatically adaptive classification levels.

The illustrative secure meeting space 12 seen in FIG. 1 also includes a meeting interface 30, which can include, as shown in FIG. 5, any of display screens 66, cameras 68, speakers 82, microphones 84, or speakerphones 212.

In some embodiments, the secure meeting spaces 12 are configured to quickly and automatically adapt to different levels of classification 242, e.g., 242a (FIG. 6), e.g., from any of unclassified, e.g., 244a (FIG. 6), to top secret classifications, e.g., 244k (FIG. 6), for the participants LDR, ATT. In some embodiments, the meeting spaces 12 are prevented from becoming active for their intended function, for example, and without limitation, prevented from being configured to accept a secure meeting 612, prevented from receiving and/or transmitting classified information, prevented from connecting to a remote room or site 40, or a combination thereof, until all required security features are activated.

Figure 15:
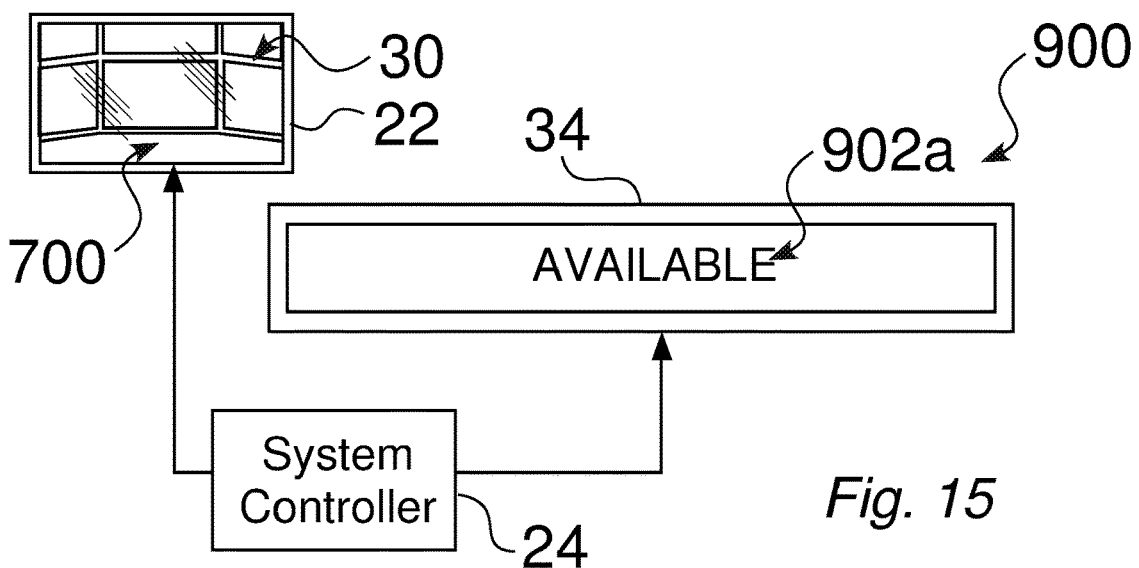
FIG. 15 shows an illustrative status display that is controlled to indicate that a secure meeting space is available for use by authorized personnel.

In some embodiments of the secure meeting space 12, the adjoining facility 16 can include a status display, banner or ticker 32, such as to alert outsiders OTH as to the security level of an active meeting 612 (FIG. 17), to inform them that a meeting 612 is in progress (FIGS. 16, 17), and/or to inform them that the secure meeting area 12 is not currently in use or is available (FIG. 15).

Figure 2:
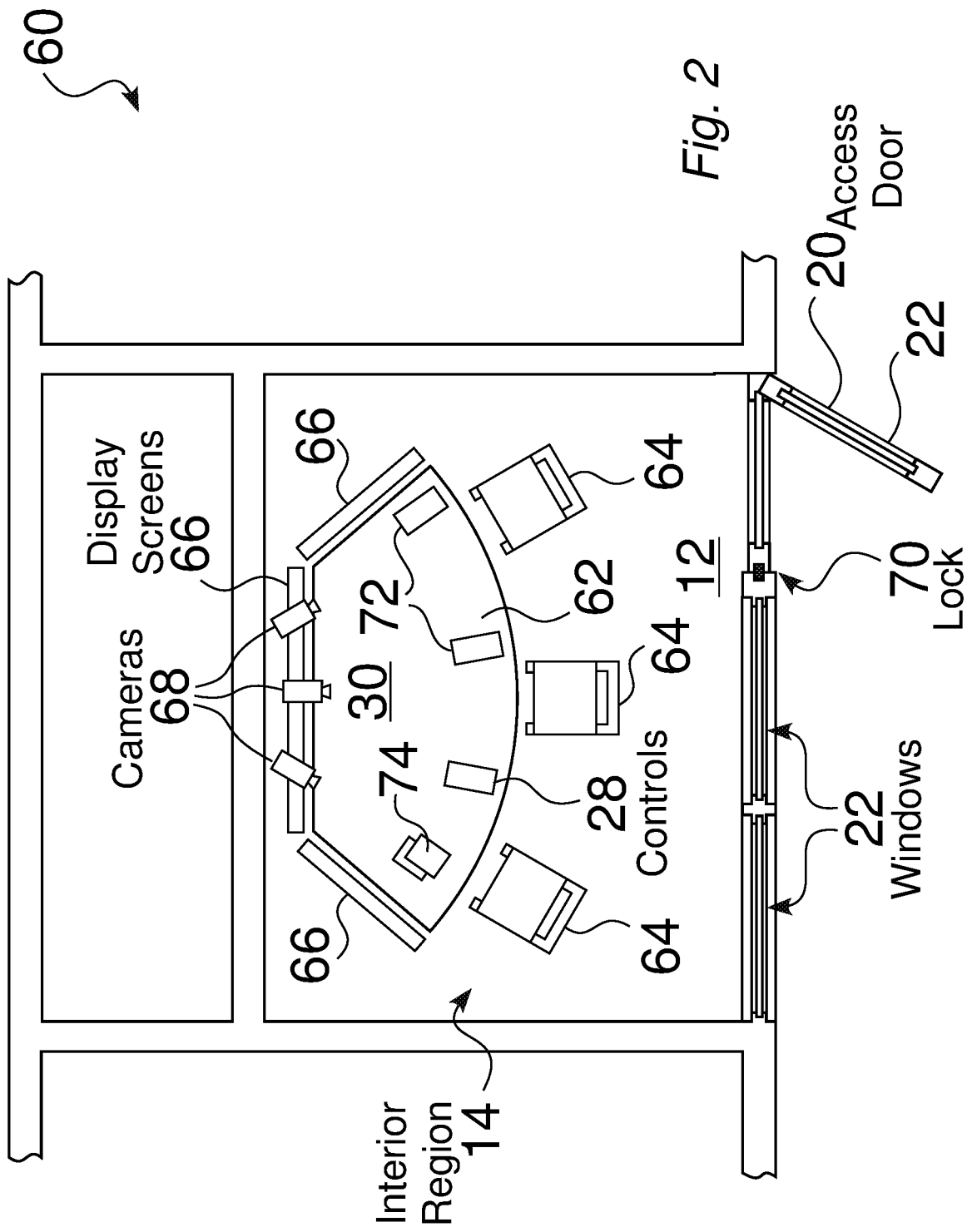
FIG. 2 is a schematic plan view of an illustrative embodiment of a secure meeting space with automatically adaptive classification levels.
Figure 3:
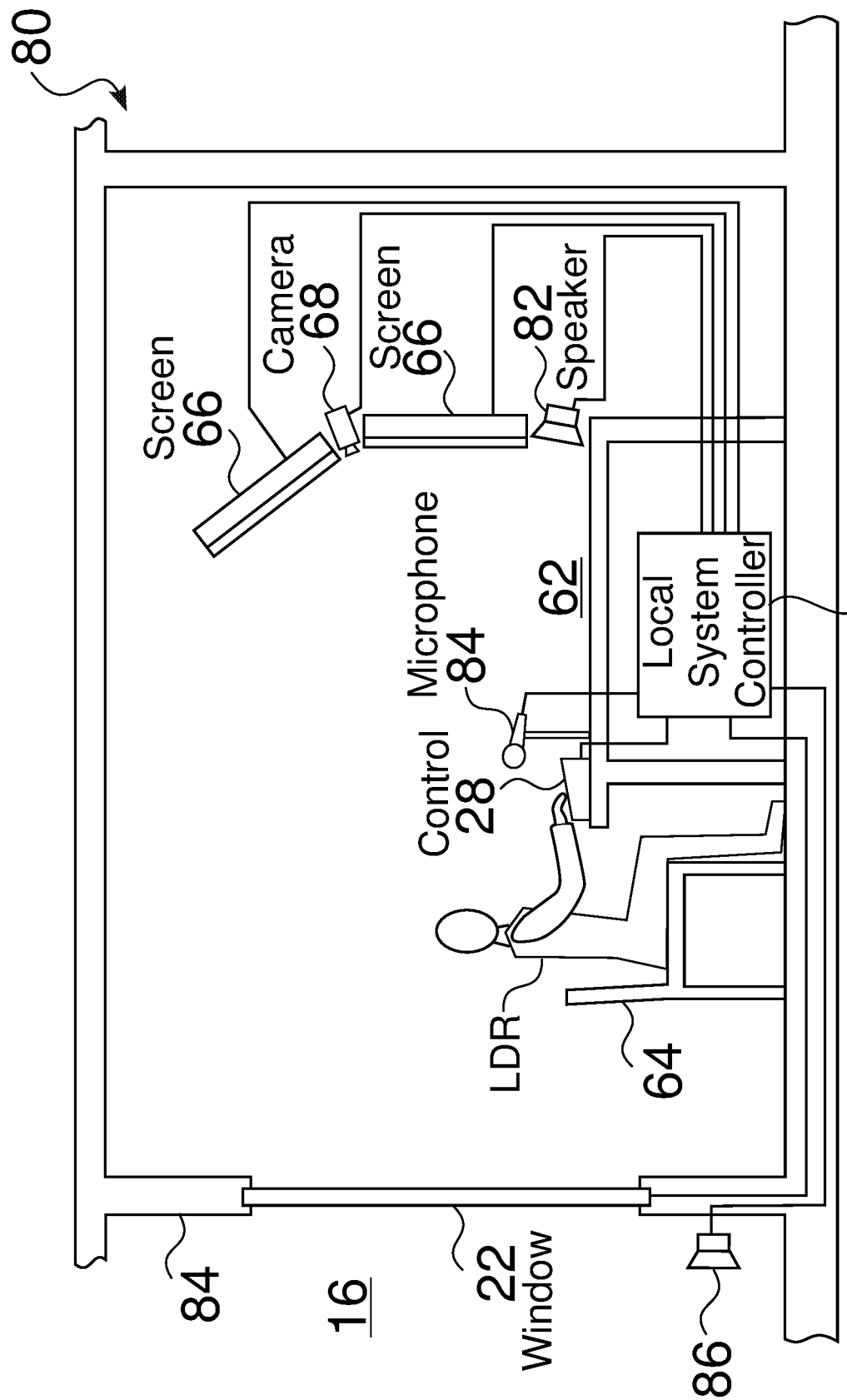
FIG. 3 is a schematic side view of an illustrative embodiment of a secure meeting space with automatically adaptive classification levels.

FIG. 2 is a schematic plan view 60 of an illustrative embodiment of a secure meeting space 12 with automatically adaptive classification levels. FIG. 3 is a schematic side view 80 of an illustrative embodiment of a secure meeting space 12 with automatically adaptive classification levels. Different embodiments of the secure meeting space 12 can be configured for one or more people LDR,ATT, such as to conduct a secure meeting 612 with other people within the secure meeting space 12, to conduct a meeting between one or more people within the secure meeting space 12 in communication with remote participants REM at one or more remote sites 40, and/or to disseminate classified information to one or more people at one or more sites 12,40.

The illustrative secure meeting space 12 seen in FIG. 2 and FIG. 3 includes a meeting interface 30 and a work surface 62 within the interior region 12, and one or more workspaces 64, such as including seating. The illustrative secure meeting space 12 seen in FIG. 2 and FIG. 3 also includes controls 28 by which a primary participant LDR who is authorized to lead a secure meeting 612 can interact with the system controller 24. In some embodiments 12, one or more of the workspaces 64 can include a corresponding interface 72, such as linked to the system controller 24, for individual input or output, such as for any of individual control, information queries, participant voting, individual display, headphone ports, speaker volume, or automated language translation.

The illustrative secure meeting space 12 seen in FIG. 2 and FIG. 3 also includes one or more displays 66, such as to display information to one or more of the participants LDR, ATT, and/or to display a video feed of remote participants REM from one or more linked remote sites 40 (e.g., for a secure video teleconference (VTC)).

The illustrative secure meeting space 12 seen in FIG. 2 and FIG. 3 includes an access door 20, through which participants LDR, ATT can enter and exit the secure meeting space, such as upon authorization through an access interface 32. One or more windows 22 can be provided between the adjoining facility 16 and the secure meeting space 12, such as installed on a common wall 14. In some embodiments, the windows 22 include privacy glass panels 700, by which the system controller 24 can control 807 (FIGS. 13, 14) the opacity of the privacy glass panels 700, such as based on a function of the operational status of the secure meeting space 12 and/or on the comparative classification level between the secure meeting space 12 and the adjoining area 16.

An illustrative embodiment of the secure meeting system comprises a meeting space 12 located within a facility 16, wherein the meeting space has an interior area 14 defined within for one or more participants LDR,ATT of a meeting 612, a door 20 providing ingress and egress between the facility 16 and the meeting space 12 for the participants LDR,ATT of the meeting 612, a controller 24 including a processor 1002 (FIG. 18), and a security feature corresponding to the meeting space 12, wherein the security feature is linked to the controller 24, wherein the controller 24 includes instructions for determining 110 a current classification level 242,244 for any of the participants LDR,ATT, the meeting space 12, or the facility 16 during the meeting 612, and automatically controlling the security feature in response to the determined 110 current classification level 242,244.

Figure 10:
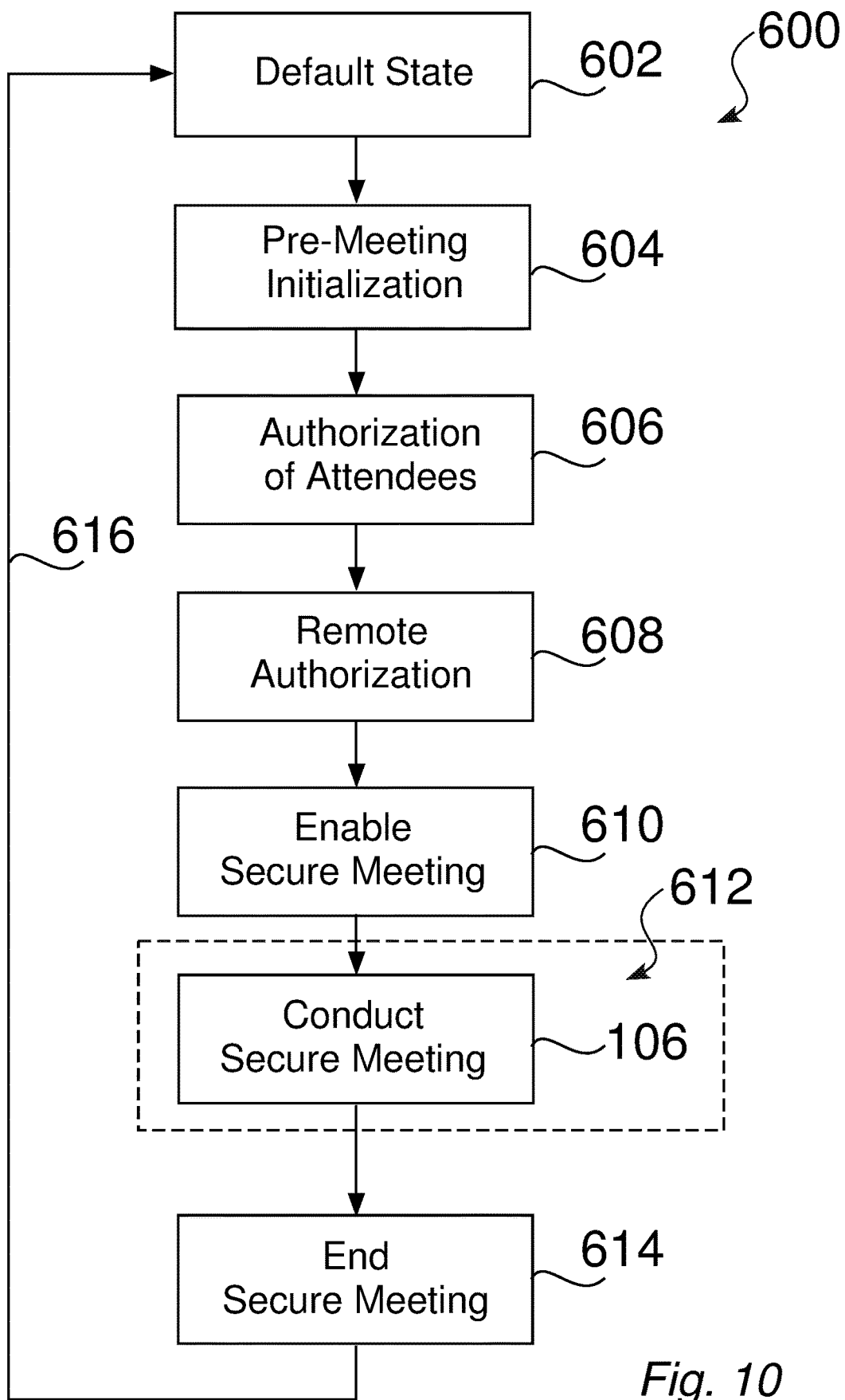
FIG. 10 shows is flowchart of an illustrative method for transitioning between different operational states for an illustrative secure meeting space.

In some embodiments, the secure meeting space 12 can include one or more external speakers 86 (FIG. 3), e.g., in the adjoining facility 16 or embedded in a common wall 84 (FIG. 3), such as to provide audio information before, during or after a secure meeting 612 (FIG. 10). In some embodiments, the output from the speakers 86 can be used to mask or obscure the conversations or other audio output 82 from a secure meeting 612, such as in combination with sound proofing or acoustic insulation.

Figure 4:
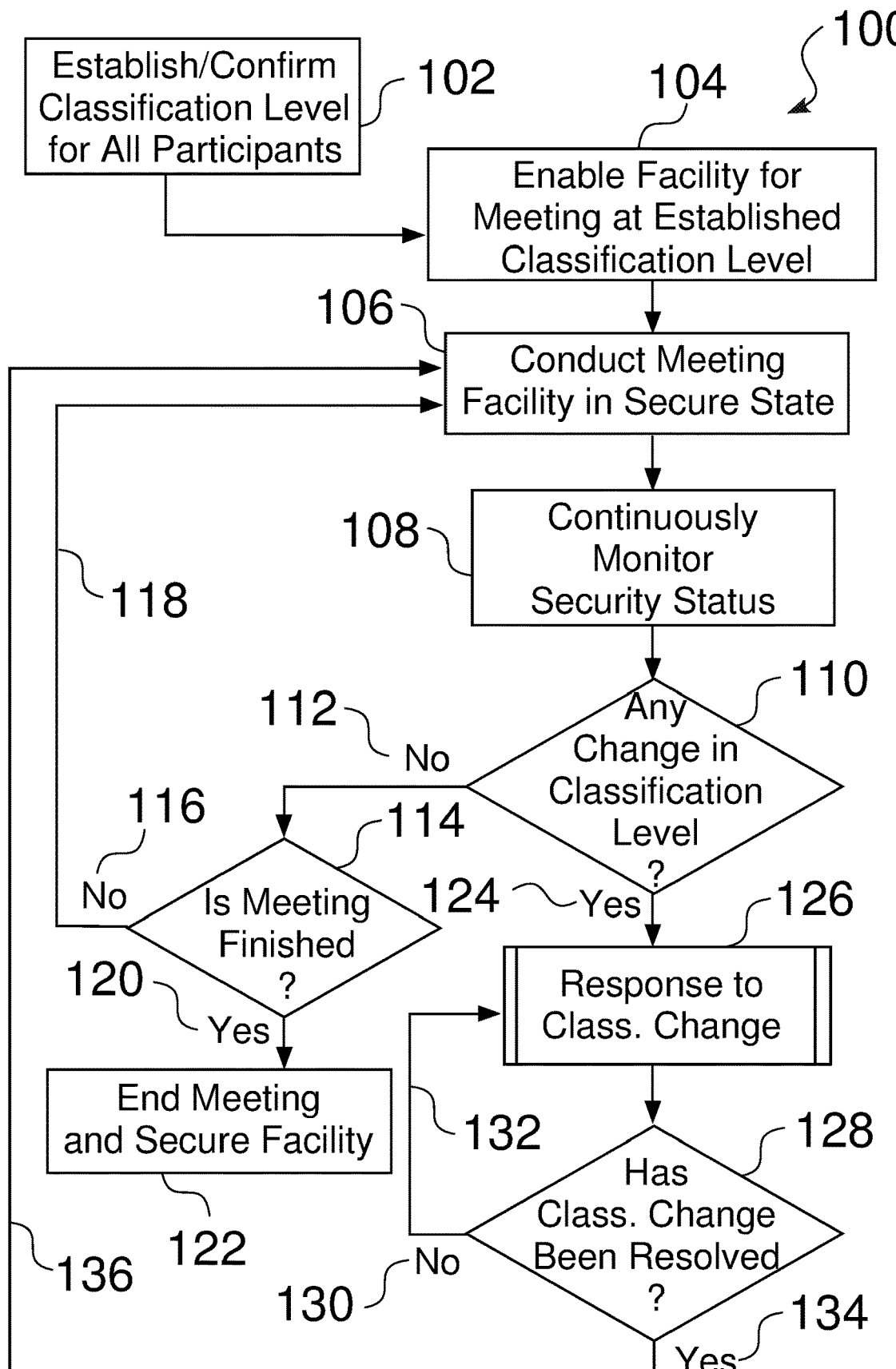
FIG. 4 is a flowchart of an illustrative method for automatically adapting to classification levels before, during and after a secure meeting.

FIG. 4 is a flowchart of an illustrative method 100 for automatically adapting to classification levels before, during and after a secure meeting 612 (FIG. 10). For instance, before a secure meeting 612 is started, the classification level 244 (FIG. 6) is determined for the meeting 612, and is established or otherwise confirmed 102 for each of the local participants LDR, ATT. In some embodiments, if the secure meeting 612 is to include communication to one or more secure remote locations 40, the classification level 244 (FIG. 6) is also established or otherwise confirmed 102 for the remote site 40 and/or each of the remote participants REM (FIG. 8).

In the illustrative method seen in FIG. 4, when it is established or confirmed 102 that all participants have a proper classification level 244 for the meeting 612, the meeting space 12 can be enabled 104 for the secure meeting 612 to commence, after which time, the secure meeting 612 can be conducted 106. The enablement 104 can include one or more actions taken by the system controller 24, such as including any of controlling the optic transmissivity properties 802 of privacy glass 22 related to windows 22 or doors 20, controlling display of information through display screens 66, allowing physical access to materials 74 (FIG. 2), and/or controlling operation of cameras 68, speakers 82, microphones 84.

In the illustrative method seen in FIG. 4, the system controller 24 can continuously monitor 108 the current status of the meeting space 12, such as to determine if any local or remote security parameters have changed which would necessitate action. If it is determined 110 that no security parameters have changed 112, if the system controller 24 determines 114 that the meeting is not finished 116, the method returns 118 to allow the meeting to continue 106. If it is determined 110 that there has been a change 124 in a security or classification level, the system controller 24 can take one or more actions 126 in response to the change 124. For instance, if an access door 20 is opened, or if it is determined that an unauthorized recording device is present or has been activated, the system controller 24 can proceed with one or more of opaquing the privacy glass 700, preventing the display of information in display screens 66, turning off or disabling any of the cameras 68, microphones 84, or speakers 82.

In the illustrative method seen in FIG. 4, the system controller 24 can further determine 128 if all current security issues have been resolved, such as though actions 126 by the system controller 24, or by other means, such as by closing doors 20, deactivating or otherwise disabling local devices, confirming authorization of a new participant ATT, or confirming a security status of a remote location 40. If it is determined 128 that all issues have been resolved 134, the system controller 24 can return 136 to allow the meeting 612 to continue 106. If not 130, the system controller 24 may return 132 to take further action 126, to automatically adapt to changing security and/or classification conditions.

When it is determined 114 that the secure meeting 612 is finished 120, such as through interaction by a lead participant LDR though controls 28 or after completion of communication with a remote site 40, the system controller 24 can secure 122 the facility 12, such as by any of changing the state 802 of privacy glass 700, preventing the display of information in display screens 66, or turning off or disabling any of the cameras 68, microphones 84, or speakers 82.

An illustrative method for operating the meeting space 12 can be implemented with a controller 24 having a processor 1002 (FIG. 18), wherein the method comprises determining 110 a current classification level 242,244 for a meeting system 10 including a meeting space 12 located within a facility 16, wherein the meeting space 12 includes an interior area 14 defined within the meeting space 12 for one or more participants LDR,ATT of a meeting 612, a door 20 providing ingress and egress between the facility 16 and the meeting space 12 for the participants LDR,ATT of the meeting 612, and a security feature corresponding to the meeting space 12, wherein the security feature is linked to the controller 24, wherein the determined 110 current classification level 242, 244 is based on any of the participants LDR,ATT, the meeting space 12, or the facility 14 during the meeting 612, and automatically controlling the security feature in response to the determined 110 current classification level 242,244. Some embodiments of the method 100 for automatically controlling or adapting a security feature of a secure meeting space can be implemented with a non-transitory computer readable medium having stored thereon a computer program having machine-readable instructions for performing, when running on a computer, FIG. 5 is a schematic block diagram 200 of components associated with an illustrative embodiment of a secure meeting space 12 with automatically adaptive classification levels. The illustrative system controller 24 seen in FIG. 5 can act directly or in conjunction with other controllers, e.g., a facility controller 26, to enable or disable one or more components related to a meeting interface 30, such as including any of displays 66, speakers 82, cameras 68, microphones 84, and/or dedicated telecommunications devices 212, e.g., a speakerphone 212.

The illustrative system controller 24 seen in FIG. 5 can enable communication with one or more remote sites or systems 40, such as through a communications interface 204 and a communication channel 206. As well, the illustrative secure meeting space 12 seen in FIG. 5 includes a control interface 28 through which a primary authorized participant LDR can interact with the system controller 24. In addition, the illustrative system controller 24 seen in FIG. 5 can interact with a controller 26 associated with the local facility 16, such as to receive information regarding the current security or classification level of the adjoining facility 16, or to transmit status information regarding a current meeting 612.

Figure 13:
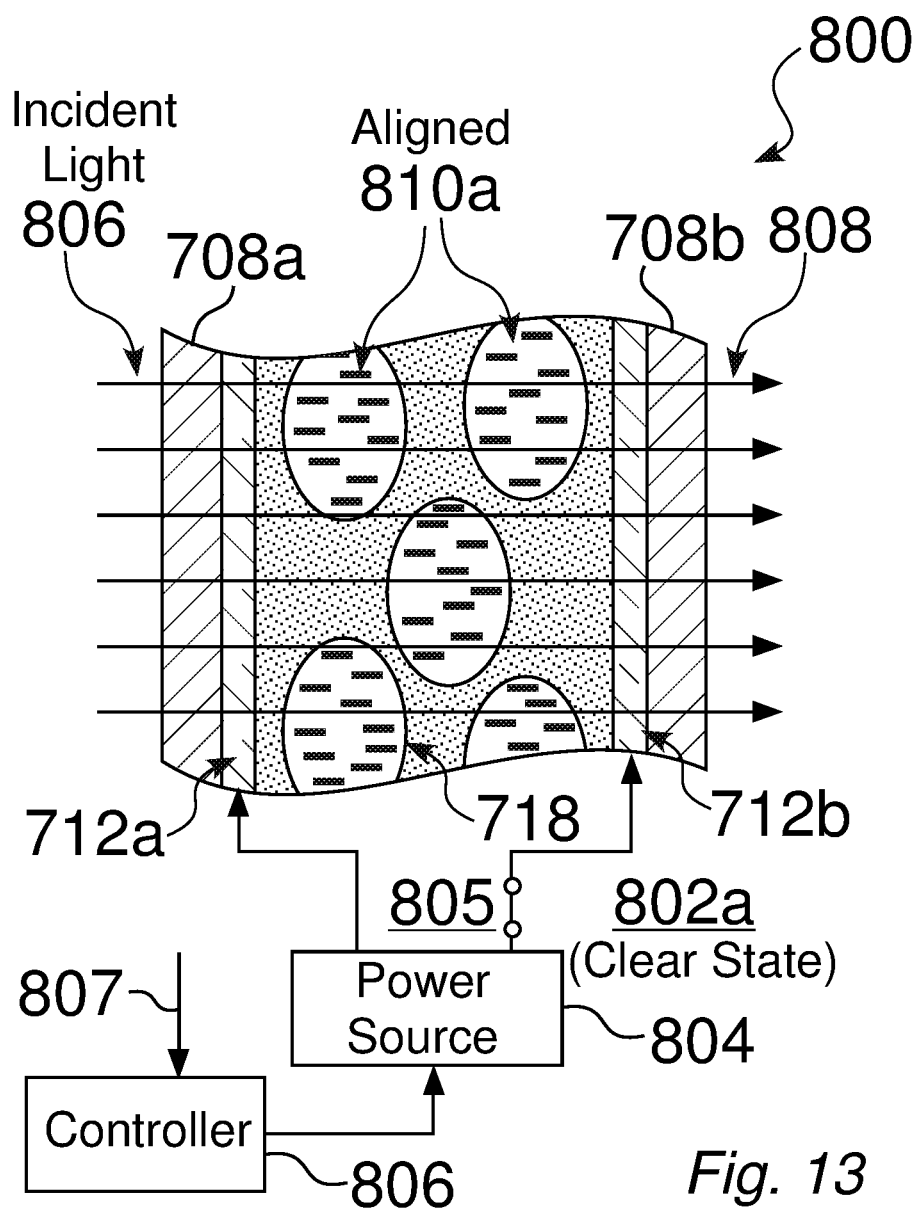
FIG. 13 is a functional view of privacy glass in a controlled optically transmissive state.
Figure 14:
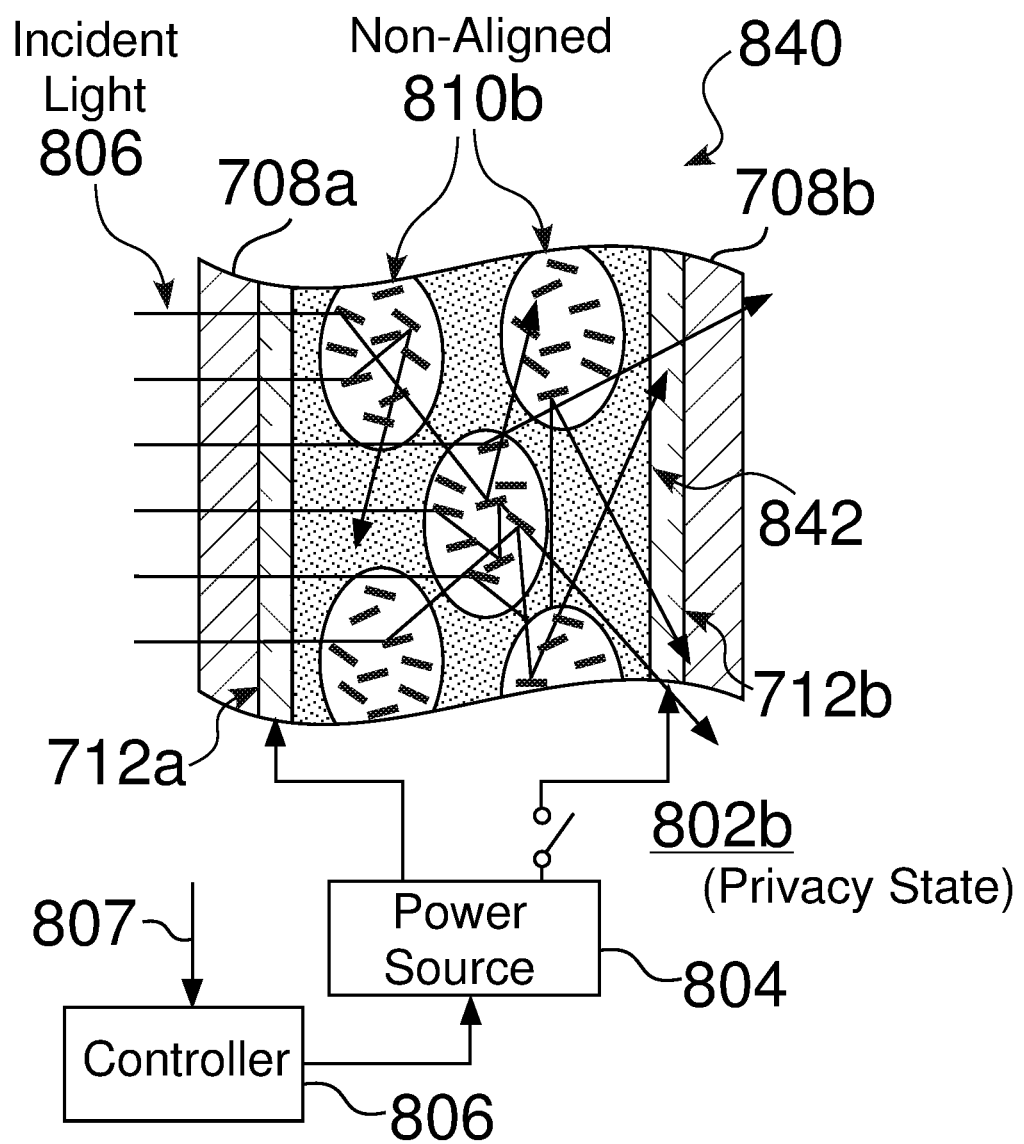
FIG. 14 is a functional view of privacy glass in a controlled optically opaque state.

The illustrative system controller 24 seen in FIG. 5 can determine status information with one or more corresponding access doors 20, such as to determine whether an access door 20 is open or closed, and locked or unlocked. If the access door 20 or common wall 84 (FIG. 4) adjoining the outer area 16 includes windows 22 having privacy glass 700, the system controller 24 can allow or prevent the transmission of incident light 806, by powering 805 (FIG. 13) or unpowering a voltage supply 804 (FIGS. 13, 14). Similarly, if the secure meeting space 12 includes one or more windows 22 that include privacy glass 700, the system controller 24 can allow or prevent the transmission of incident light 806, before, during or after a secure meeting 612, by powering 805 or unpowering a voltage supply 804.

The illustrative secure meeting space 12 seen in FIG. 5 can include one or more sensors 208 that can be controlled by and/or transmit information to the system controller 24. For instance, the illustrative secure meeting space 12 seen in FIG. 5 can include sensors 208 for identifying participants LDR, ATT. In some embodiments, the system 12 can include one or more sensors 208 or other mechanisms that are configured to detect the presence of all occupants within the secure meeting space 12, and require that the occupants either input their clearance if a badge 304 is not detected, or otherwise be verified by properly badged users LDR, ATT. In some embodiments, the system can include one or more sensors 208 for determining any of the presence of electronics, the presence of wireless communications signals, the presence of firearms or explosives, and/or the presence of smoke, fire, carbon monoxide or other substances.

As also seen in FIG. 5, the secure meeting space 12 can include one or more environmental systems 210 that can provide information to or receive signals from the system controller 24. For instance, the system controller 24 can be provided with the current status of a power system, a lighting system, a heating, ventilation or air conditioning system, and/or can provide control for such systems, such as for general operation, and/or as part of security functions that can automatically adapt to changes in classification levels.

As further seen in FIG. 5, the system controller 24 can be connected with the access interface 32, such as located in the adjoining facility 16, to regulate the authorization of participants LDR, ATT. Additionally, the secure meeting space 12 can include an external status display 34 by which the system controller 24 can display one or more messages regarding the current status of the facility 12 to personnel OTH who are located in the adjoining facility 16.

The illustrative secure meeting space 12 seen in FIG. 5 also includes a memory 224 by which the system controller and retrieve and store information. For instance, in some embodiments 12, the system controller 24 can configure one or more security settings of responses 402 (FIG. 9), and/or store logs for one or more of the secure meetings 612, in which the logs may include any of meeting time, meeting duration, meeting participants, authorization information, classification level, security anomalies, and security actions. In some embodiments, the log can include a secure encrypted recording of information from a secure meeting 612.

Figure 6:
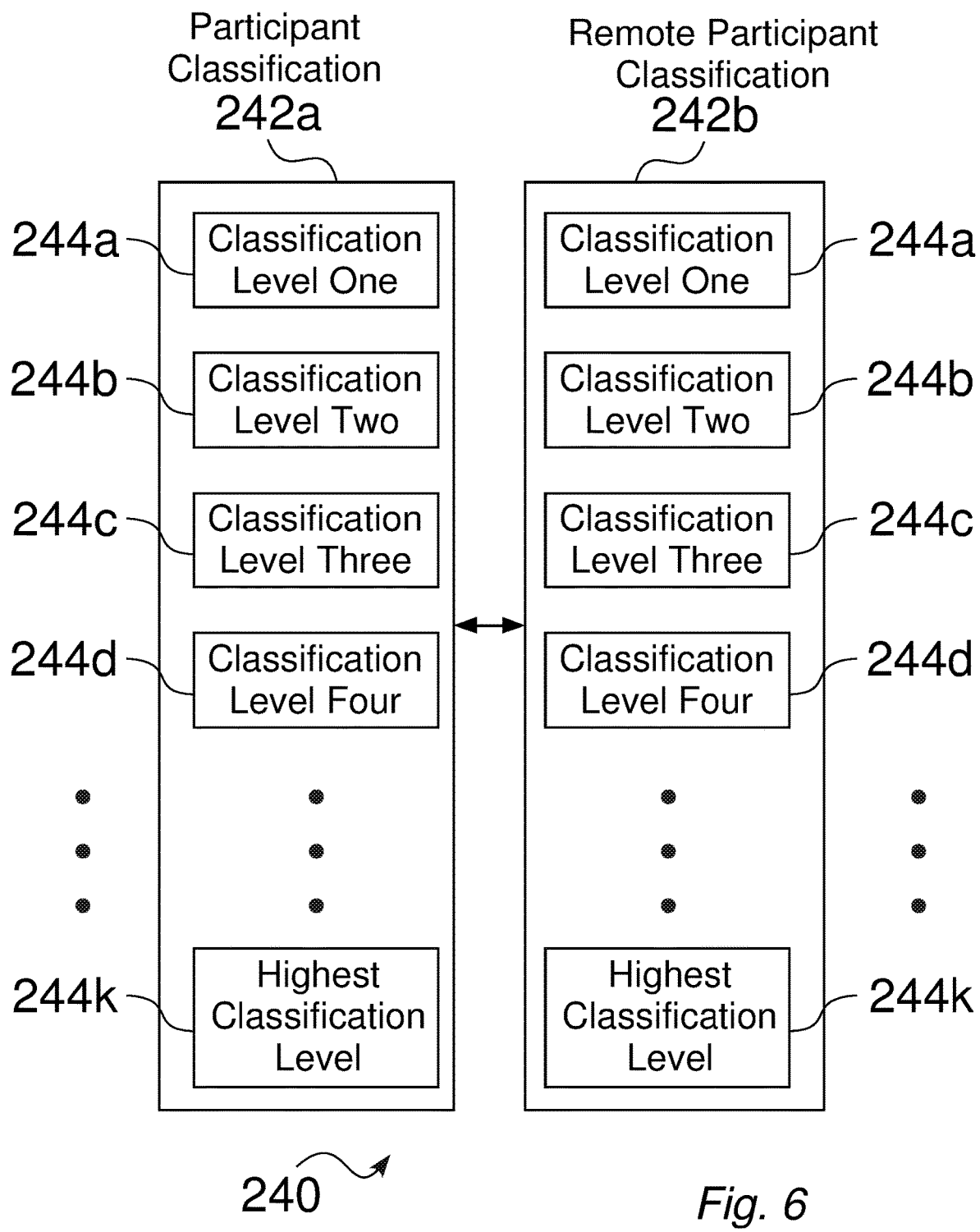
FIG. 6 is a schematic block diagram of different participant classification levels for an illustrative embodiment of a secure meeting space with automatically adaptive classification levels, such as in relation to a remote meeting space having corresponding participant classification levels.

FIG. 6 is a schematic block diagram 240 of different classification levels 242, e.g., 242a,242b for an illustrative embodiment of a secure meeting space 12 automatically adaptive classification levels 244, e.g., 244a-244k, such as corresponding to the classification level 244 for each of the local participants LDR, ATT and remote participants REM. Some embodiments of classification levels 244 include three levels of classification: Confidential, Secret, and Top Secret. In some embodiments, participant classification levels are used in addition to level markings for information, (i.e., documents, communications, etc. that have been marked with classification level insignia) to determine meeting space usage. In some embodiments, the system controller 24 can utilize any of optical character recognition (OCR), speech/audio recognition, or other document sensing, e.g., watermarks, toner marks, or embedded tags to identify classification insignia embedded in documents and/or communications, before allowing display or transmission. Furthermore, the participants LDR, ATT, REM of a secure meeting 612 must typically be authorized, such as based on their classification level and a specific subject of the meeting. For example, dissemination of classified program/project information is often restricted to participants who are authorized for both the required clearance level and for a specific program. Thus, in many embodiments, a system controller 24 may check that a participant is meeting authorized based on a participant's classification level and project/program involvement/authorization.

Figure 7:
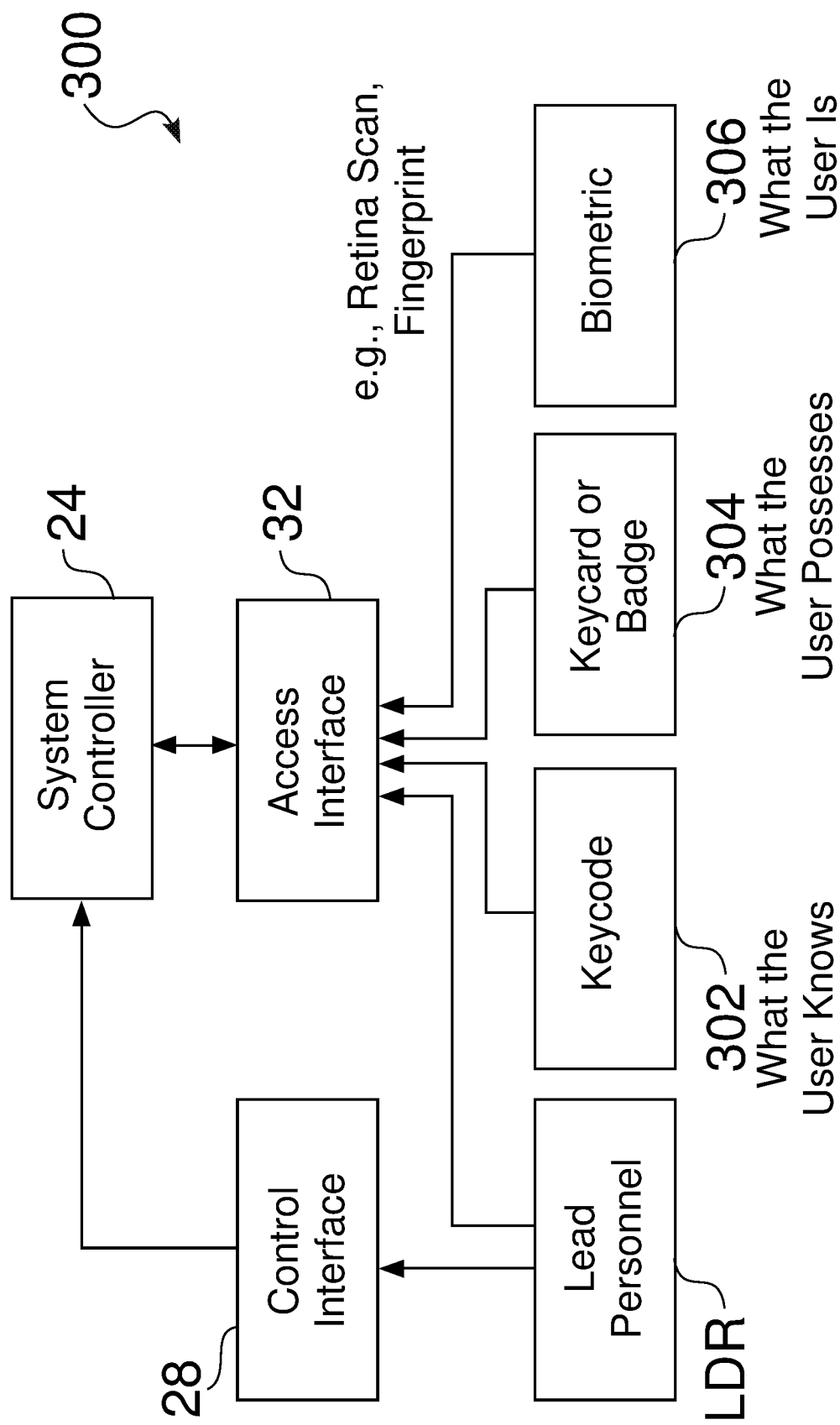
FIG. 7 is a schematic diagram controlled access for an illustrative secure meeting space, using an access interface in conjunction with a system controller.

FIG. 7 is a schematic diagram 300 showing controlled access to a secure meeting space 12, using an access interface 32 in conjunction with a system controller 24. The illustrative access interface 32 seen in FIG. 7 can authorize participants LDR, ATT by one or more mechanisms, such as based on any of:

a key code 304 (or other information that the user knows);
a sensor for sensing a keycard, badge 302 or chip (or another identifier that the user possesses); or
a sensor for sensing one or more biometric factors or other unique aspects of the user (what the user is).

In some embodiments, the lead participant LDR can provide authorization for themselves and/or for other participants ATT, either though the access interface 32, which can be located outside the secure meeting space 12 in an adjoining facility 16, or through a control interface 28, which can be located within interior region 14 of the secure meeting space 12.

The meeting space 12 can include additional features for onsite and/or offsite functionality. For instance, FIG. 8 is a functional schematic diagram 400 showing one or more security responses at a remote site 40 as a function of a change in classification level within a secure meeting space 12. For instance, for a secure meeting space 12 that includes a door sensor 208 (FIG. 5) that is connected to the system controller 24, is the door 20 is opened during a secure meeting 612, the local system controller 24 can blank screens 66 and/or momentarily mute a speakerphone 212 or a video teleconference established between the local meeting space 12 and a remote site 40, while alerting remote participants REM aurally 406 and/or visibly 408 that a door 20 at the meeting space 12 is open. Similarly, if a security or classification level is determined to have changed at a remote location 40, the system controller 24 can be configured to take one or more actions 126 (FIG. 4) locally.

Figure 9:
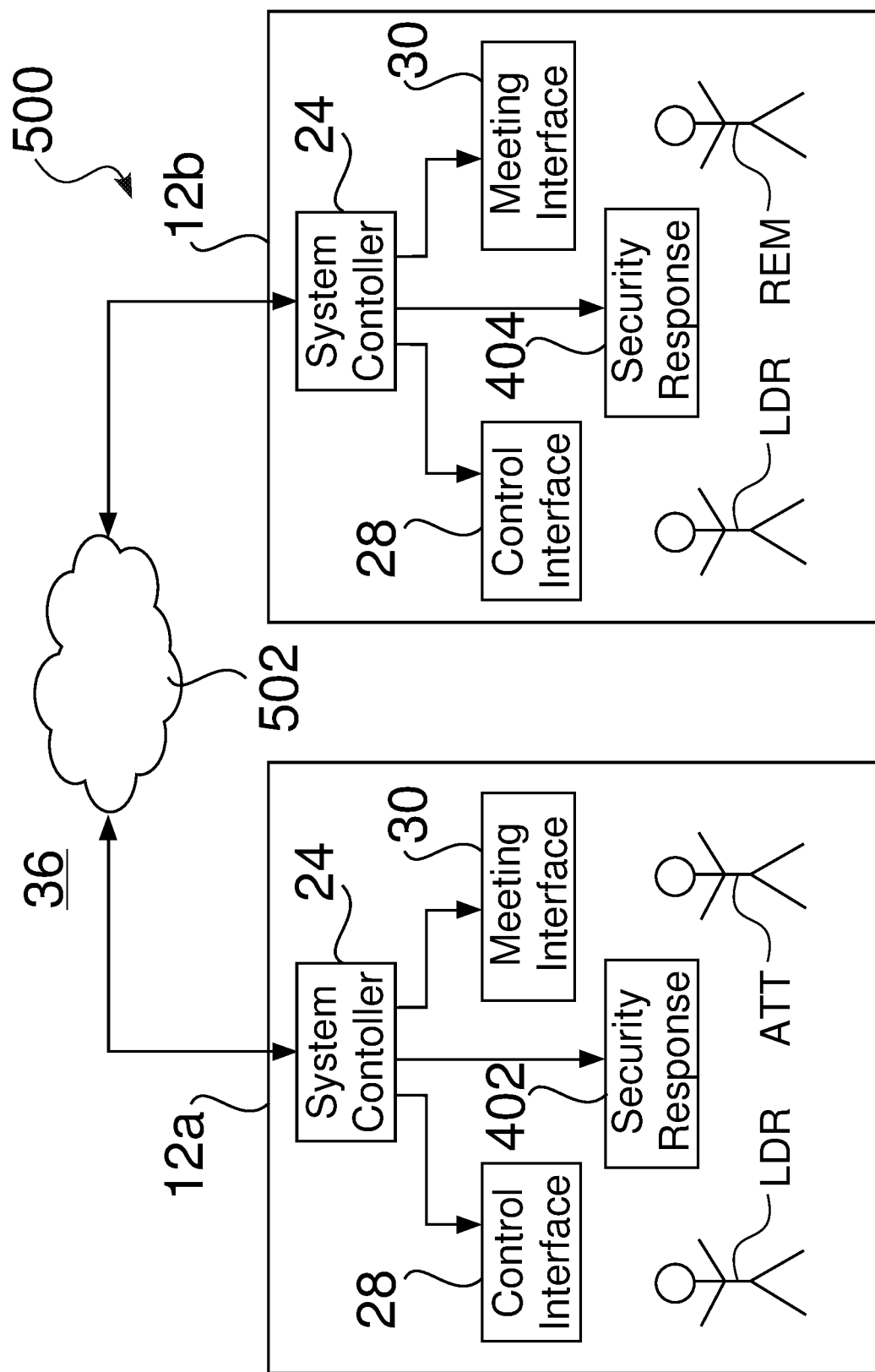
FIG. 9 is a schematic view of an illustrative secure meeting system that includes a plurality of networked secure meeting spaces with automatically adaptive participant classification levels.

FIG. 9 is a schematic view of an illustrative secure meeting system 500 that includes a plurality of networked secure meeting spaces 12 with automatically adaptive classification levels, and networked security responses 402,404. For instance, both of the secure meeting spaces 12, e.g., 12, 12b, can include similar functionality to each other, or can include different functionality, such as different meeting interfaces 30 corresponding to any of different numbers of participants, participant rank, participant expertise, participant skills, and or participant classification level 242,244. During a networked secure meeting between a local site 12 and a remote site 12, e.g., 12b, such as established over a communication channel 36 established over a network 502, the security sensing and security response can also be different between the sites 12a, 12b.

Furthermore, the information provided to different participants at the same or different meeting spaces 12a, 12b can be different, such as based on the specific expertise or rank of the personnel LDR, ATT, REM. For instance, a leader or ranking officer LDR can be provided with managerial, tactical or strategic information for the secure meeting, while a technical specialist ATT can be provided with specific technical information as it related to the secure meeting 612, and/or while a remote data analyst REM can be provided with statistical information as it relates to the secure meeting 612.

FIG. 10 shows a flowchart of an illustrative method 600 for transitioning between different operational states for an illustrative secure meeting space 12, such as before, during and after a secure meeting 612. For instance, an illustrative secure meeting space 12 can have a corresponding default state 602 when not otherwise used for establishing and conducting a secure meeting 612. In some embodiments 12, system controller 24 can secure the facility in a lock-down mode, such as by controlling privacy glass 700 in a default state, e.g., clear or opaque), locking an access door 20, disabling the control interface 28 and/or the meeting interface 30, and deleting or protecting stored information, e.g., logs, within system memory 224.

In some embodiments 12, a leader LDR or other authorized personnel ATT can initiate preparing the secure meeting space for a meeting 612, such as by accessing the meeting space 12 through the access interface 32, and initiating interaction with the system controller 24 through the control interface 28. Once initial start-up 604 is provided, some embodiments 12 allow authorization 606 of one or more additional local participants ATT, such as directly through the access interface 32, or through the control interface 28 by either the participants ATT or as authorized by the leader LDR.

In some embodiments 12, a lead participant LDR can be required to verify or authorize 606 the proper security level for all participants ATT that are present, such as through the control interface 28, e.g., through touchscreen entry, such as before a meeting 612 is started, before classified materials 74 are provided or displayed 66 to the participants, or before a classified call or video teleconference (VTC) is connected over a communication channel 36.

For embodiments 12 in which one or more remote sites 40 are to be connected for the secure meeting 612, the system controller 24 can coordinate remote authorization 608, such as from the remote site 40 to the local meeting space 12, and from the local meeting space 12 to the remote site 40.

Once all security parameters are established, the system controller 24 can enable 610 the secure meeting 612 to be conducted 106 (FIG. 1) and monitored 108 (FIG. 1). In some embodiments 12, the system controller 24 can configure, enable or disable one or more features, such as based on the classification level 242,244 of the meeting and the participants LDR,ATT,REM. For instance, in some embodiments, the secure meeting space or pod 12 cannot become 'active', e.g., such as to accept a classified call from a remote site 40, until all security features are active, e.g., all participants are authorized, the access door 20 is closed, the privacy glass 700 is opaque, and the meeting interface 30 is properly configured.

When it is determined 114 (FIG. 1) that the secure meeting is finished 120 (FIG. 1), the system controller 24 can take one or more actions 614, such as before the departure of the participants ATT, e.g., by disabling communication channels 36 to one or more remote sites 40, blacking out displays 66, and turning off speakers 82 and/or microphones 84. Some of the actions can be performed in a sequential order, such as clearing privacy glass 700 after disabling the meeting interface 30. After the meeting 612, the illustrative system 12 shown in FIG. 10 can return 616 to a default state 602, wherein the meeting space 12 can be secured against unauthorized entry or open for use depending on a default room assignment.

Privacy Glass for Secure Meeting Space.

Figure 11:
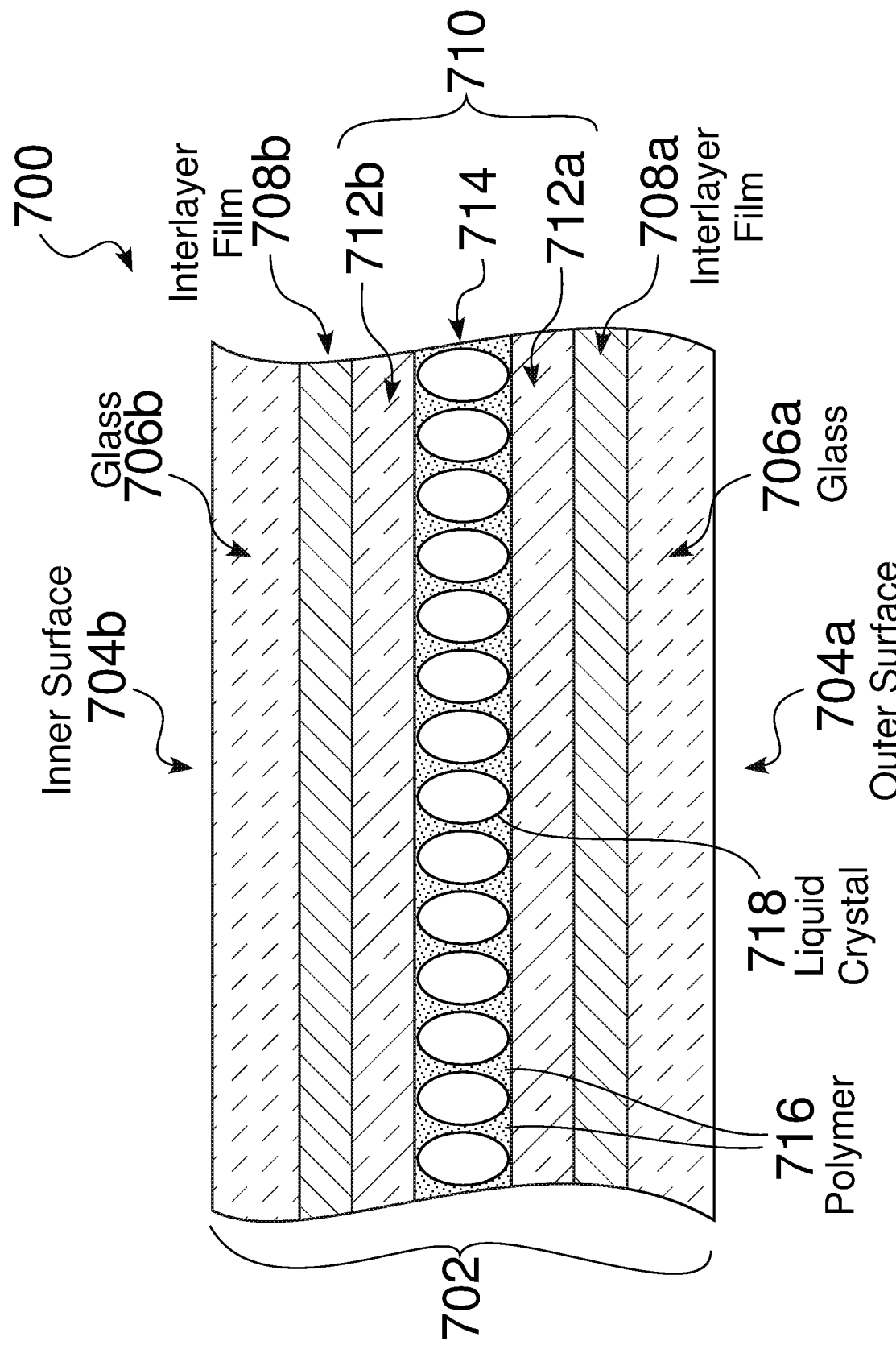
FIG. 11 is a partial cutaway view of an illustrative embodiment of privacy glass for use in conjunction with a secure meeting space.
Figure 12:
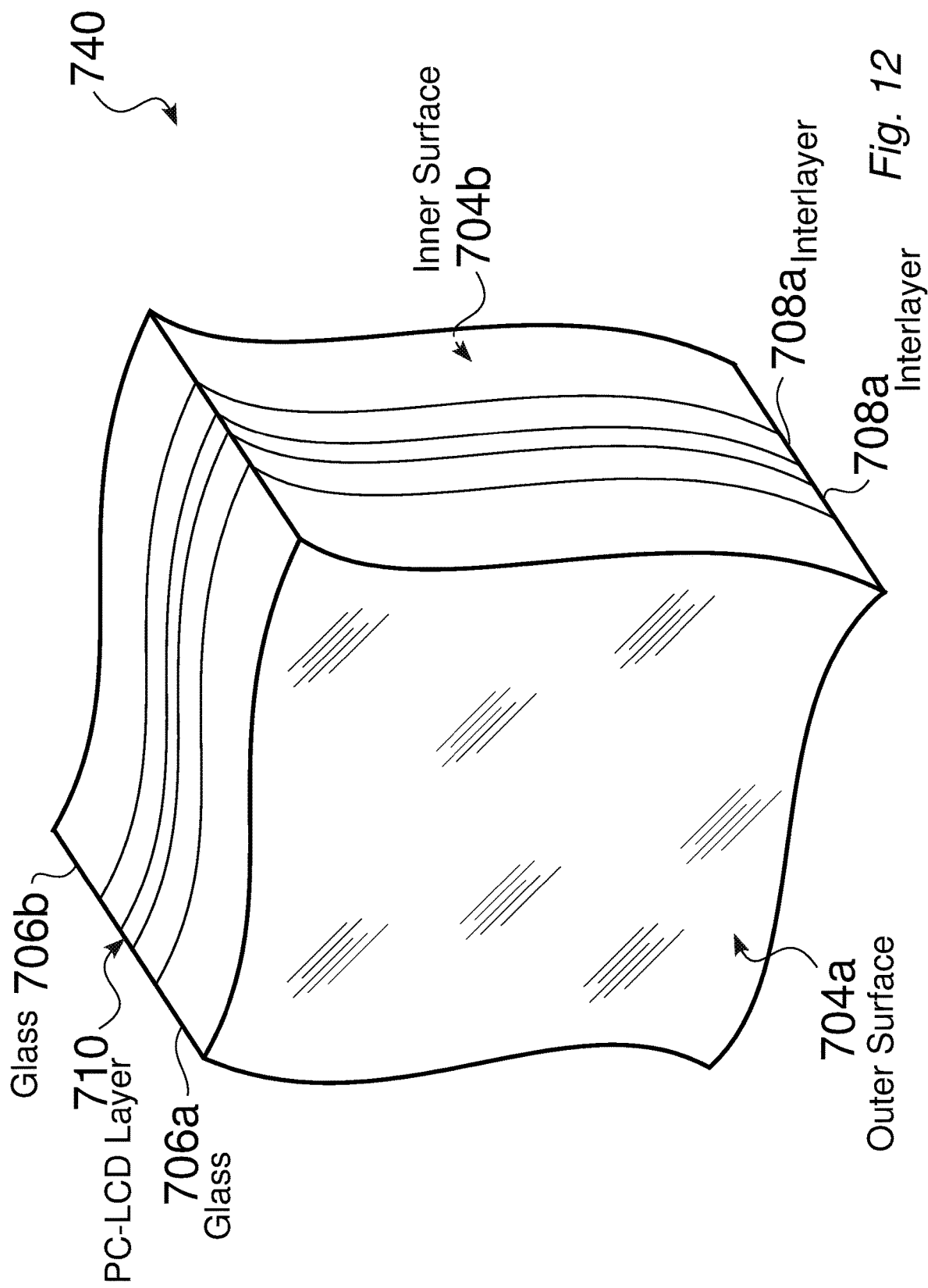
FIG. 12 is a partial perspective view of functional layers of an illustrative embodiment of privacy glass for use in conjunction with a secure meeting space.

FIG. 11 is a partial cutaway view of an illustrative privacy glass 700 which can be implemented in some embodiments of the secure meeting space 12. FIG. 12 is a partial perspective view 740 of some of the functional layers of an illustrative embodiment of privacy glass 700 for use in some embodiments of the secure meeting space 12.

The illustrative privacy glass 700 seen in FIG. 11 includes layered structure 702 that includes a composite central layer 714 that having liquid crystal molecules (LCD) 718 located within a polymer 716. The composite central layer 714 seen in FIG. 11 is sandwiched between opposing clear electrically conductive film layers 712a, 712b, such as comprising an indium tin oxide (ITO) coating on a polyethylene terephthalate (PET) film. In turn, the film layers 712a, 712b are sandwiched between opposing interlayer film layers 708a, 708b, and glass layers 706a, 706b, which define opposing outer surfaces 704a,704b. The illustrative laminated structure 700 provides strength, and is configured not to shatter if damaged. In some embodiments, the privacy glass 700 is available through Linyi Ruihe Glass Door & Window Ltd. Co., of Linyi City, China.

The central layer 714 can be powered by a power supply 802 (FIGS. 13, 14) to controllably alter the tranmissivity of light 806 (FIGS. 13, 14) through the central layer 714. For instance, in some embodiments, when a voltage 805 (FIG. 13) is applied across opposing sides of the central layer 714, the liquid crystal molecules (LCD) 718 align 810a, wherein the central layer 714 allows incident light 806 to pass through 808 (FIG. 13). In these embodiments, if the power supply 804 fails or is removed, the privacy glass 700 remains (or becomes) opaque, thus acting as a fail-safe measure to prevent classified material from inadvertent exposure to the outer area 16.

FIG. 13 is a functional view 800 of an illustrative embodiment of privacy glass 700 that can be used for windows 22 in some embodiments of the secure meeting space 12, in which the privacy glass 700 is configured to be in an optically transmissive or clear state 802a when powered 805 by a power source 804, such as under control of a local controller 806, or based on a signal 807 received from the system controller 24.

While in an optically transmissive state 802a, the illustrative liquid crystal molecules 718 seen in FIG. 13 are controllably aligned 810a, such that incoming light 806 that is incident on a first surface 704, e.g., 704b (FIG. 12), of the privacy glass 700 can pass through the privacy glass 700 and exit the opposing surface 704, e.g., 704a (FIG. 12), without substantial reflection, absorption, or interference 842 (FIG. 14).

FIG. 14 is a functional view 840 of the illustrative embodiment of privacy glass 700 shown in FIG. 13, in which the privacy glass 700 is controlled to be in an opaque state 802b when power 805 (FIG. 13) is not applied by a power source 804, such as by a local controller 802, or based on a signal 807 received from the system controller 24.

While in an opaque state 802b, the illustrative liquid crystal molecules 718 are randomly oriented, such that incoming light 806 that is incident on a first surface 704, e.g., 704b, is randomly scattered 842 by the liquid crystal molecules 718, wherein the privacy glass 800 appears as opaque 802b.

When in an optically transmissive state 802a, outwardly directed incident light 802 from inside the secure meeting space 12, as well as inwardly directed incident light 802, can typically pass through the privacy glass 700, such that the interior 14 of the secure meeting space 12 is visible to others OTH in the adjoining facility, while meeting participants LDR,ATT can similarly view the adjoining facility 16. In some embodiments, the privacy glass 700 can be used in conjunction with mirrored surfaces and/or lighting, to provide different optical characteristics. As well, in some embodiments, when the privacy glass 700 is controlled to be in an opaque state 802b, a projected image can be displayed on one or both surfaces 704a,704b, such as to display information or to provide further opacity When in an opaque state 802a, outwardly directed incident light 802 from inside the secure meeting space 12, as well as inwardly directed incident light 802, is typically diffused and/or reflected 842, such that the interior 14 of the secure meeting space 12 is not visible to others OTH in the adjoining facility, while meeting participants LDR,ATT can similarly not view the adjoining facility 16.

In some embodiments of the secure meeting space 12, the privacy glass 700 can appear as clear 802a when the secure meeting space 12 is used for an unclassified meeting 612, and as opaque 802b when a classified meeting or call 612 is taking place. In some embodiments of the secure meeting space 12, if the outer area 16 is at the same classification level 242,244, the windows 22 can be cleared 802a. In some embodiments of the secure meeting space 12, if the classification level 242,244 of the outer area 16 is lowered below that of a current secure meeting or call 612 (such as if a tour is coming through), the system controller 24 or local controller 806 (FIGS. 13, 14) can automatically opaque 802b the privacy glass 700.

Status Displays for Secure Meeting Spaces.

As discussed above, some embodiments of the secure meeting space 12 can include a supplementary display 34, such as within the adjoining facility 16, which can signify the current status and/or classification level of the secure meeting space 12.

For instance, FIG. 15 is a functional view 900 shows an illustrative status display 34 that is controlled to indicate that a secure meeting space 12 is available 902a for use by authorized personnel. (can indicate schedule). The illustrative window 22 having privacy glass seen in FIG. 15 is controlled to be optically transmissive 802a, such that personnel located in the adjoining facility 16 can see into the available meeting space 12, such as to see the disabled meeting interface 30.

Figure 16:
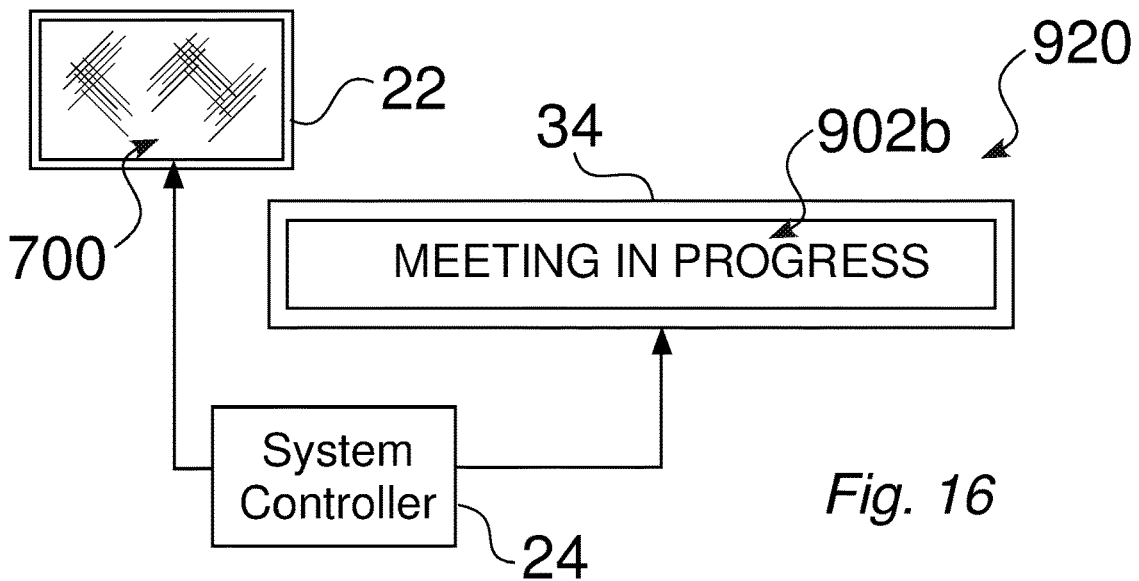
FIG. 16 shows an illustrative status display that is controlled to indicate that a meeting is in progress within a corresponding secure meeting space.
Figure 17:
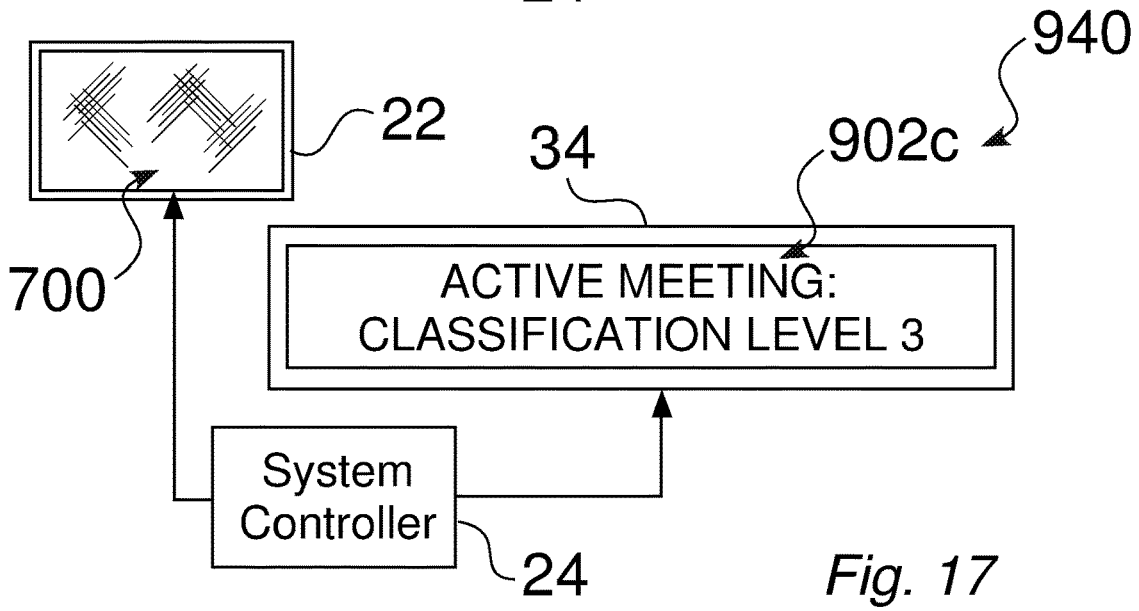
FIG. 17 shows an illustrative status display that is controlled to indicate that there a current meeting is active within a corresponding secure meeting space, and also indicating the classification level of the current meeting.

FIG. 16 is a functional view 920 of an illustrative status display 34 that is controlled to indicate 902b that a meeting 612 is in progress within a corresponding secure meeting space 12. FIG. 17 is a functional view 940 that shows an illustrative status display 34 that is controlled to indicate 902c that there a current meeting 612 is active within a corresponding secure meeting space 12, and also to indicate the classification level, e.g., 'LEVEL 3', of the current meeting 612. As seen in FIGS. 16 and 17, the illustrative window 22 having privacy glass 70 is controlled to be optically opaque 802b, such that personnel located in the adjoining facility 16 are prevented from viewing the interior 14 of meeting space 12.

In some embodiments, the illustrative status display 34 seen in FIGS. 15-17 can include a standalone display 34 located outside of the secure meeting space 12, within the adjoining facility 16. In some embodiments of the secure meeting space 12, the display 34 may be provided, such as through the system controller 24, to one or more local and/or remote nodes, such as networked computers or other devices, wherein related personnel, e.g., OTR (FIG. 1) can determine or be notified of the current status of the secure meeting space 12. Furthermore, in some embodiments 12, the system controller 24 can provide other status information to an external computer or to remote site 40, such as classifications for upcoming meetings, meeting schedules, participant schedules, reservation queues, warnings of a room's current usage such as a different classification level in use, or substantially any combination thereof.

Figure 18:
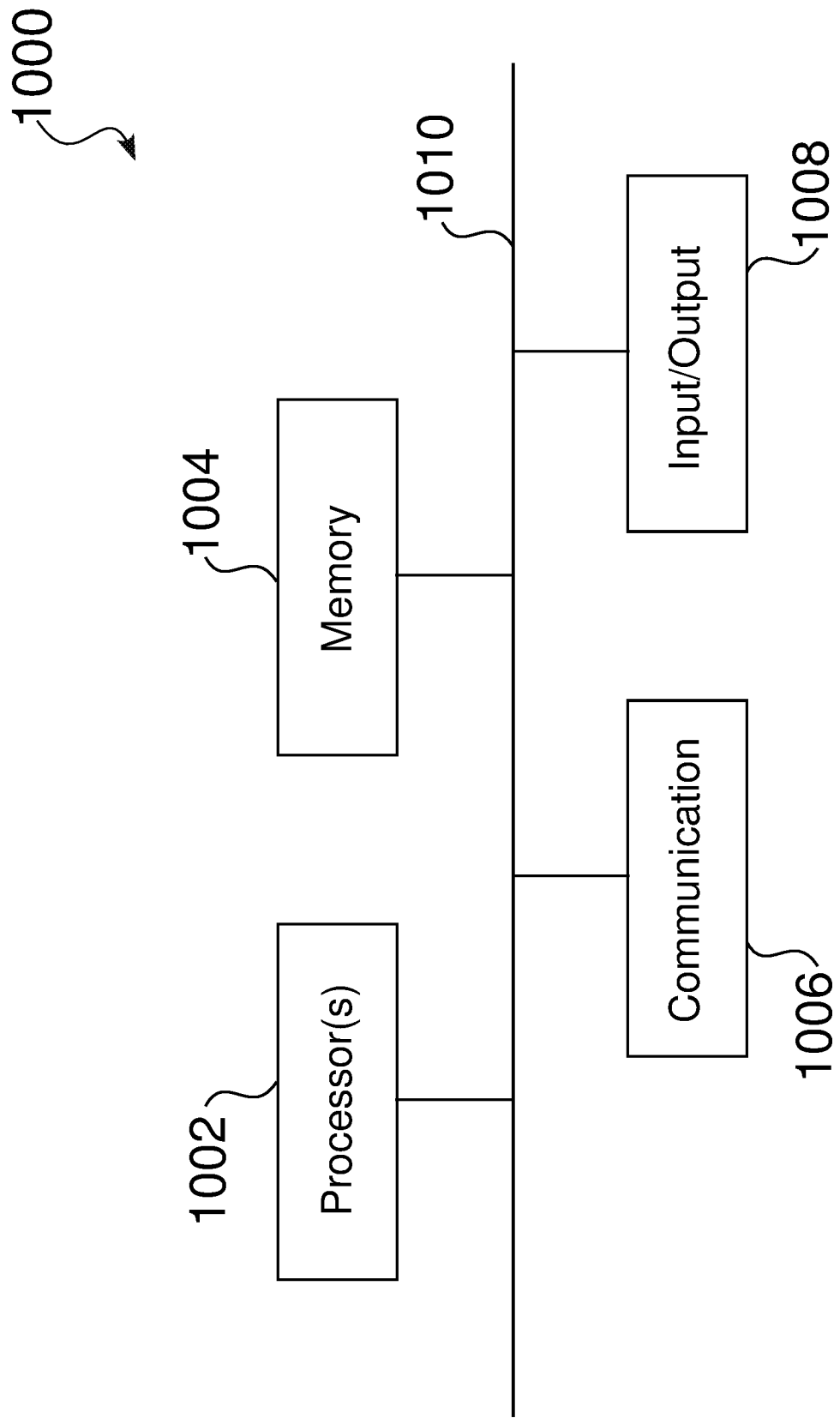
FIG. 18 is a high-level block diagram showing an example of a processing device that can represent any of the systems described herein.

FIG. 18 is a high-level block diagram showing an example of a processing device 1000 that can represent any of the systems described above. Any of these systems may include two or more processing devices such as represented in FIG. 18, which may be coupled to each other via a network or multiple networks.

In the illustrated embodiment, the processing system 1000 includes one or more processors 1002, memory 1004, a communication device 1006, and one or more input/output (I/O) devices 1808, all coupled to each other through an interconnect 1010. The interconnect 1010 may be or include one or more conductive traces, buses, point-to-point connections, controllers, adapters and/or other conventional connection devices. The processor(s) 1002 may be or include, for example, one or more general-purpose programmable microprocessors, microcontrollers, application specific integrated circuits (ASICs), programmable gate arrays, or the like, or a combination of such devices. The processor(s) 1002 control the overall operation of the processing device 1000. Memory 1004 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 1004 may store data and instructions that configure the processor(s) 1002 to execute operations in accordance with the techniques described above. The communication device 1006 may be or include, for example, an Ethernet adapter, cable modem, Wi-Fi adapter, cellular transceiver, Bluetooth transceiver, or the like, or a combination thereof. Depending on the specific nature and purpose of the processing device 1000, the I/O devices 1008 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

Some of techniques introduced above can be implemented by using programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium, e.g., a non-transitory computer readable medium, and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media, e.g., read-only memory (ROM); random access memory (RAM); magnetic disk storage media; optical storage media; flash memory devices; etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A system, comprising:
 a meeting space located within a facility, the meeting space having an interior area defined within;
 a meeting interface, operable in the meeting space according to user initialized meeting parameters;
 a door providing ingress and egress between an outer area and the meeting space, wherein the outer area is defined within the facility, adjoining the meeting space;
 a controller including a processor, operably coupled to the meeting interface; and
 a door sensor commutatively coupled to the controller, wherein the controller includes instructions, which when executed by the processor, causes the controller to perform the steps of:
  determining status information associated with the meeting space using transmitted information from the door sensor; and
  disabling one or more components related to the meeting interface in response to the determined status information and the user initialized meeting parameters.

2. The system of claim 1, further comprising:
 a glass window located between the outer area and the meeting space,
 wherein the glass window is operable to be in a first state and a second; and
 the controller includes instructions, which when executed by the processor, causes the glass window to be in either the first state or the second state in response to the determined status information.

3. The system of claim 2, wherein the door includes the glass window.

4. The system of claim 2, wherein the controller includes instructions for controlling the glass window to be in the second state based on the user initialized meeting parameters associated with the meeting space.

5. The system of claim 2, wherein the controller includes instructions for controlling the glass window to be in either the first state or the second state based on the user initialized meeting parameters.

6. The system of claim 1, wherein the controller includes instructions for:
 detecting the presence of participants within the meeting space; and
 requiring that all of the participants be verified by a properly badged local participant.

7. The system of claim 1, wherein disabling one or more components related to the meeting interface includes at least one of:
blanking a display screen,
muting a speakerphone, or a video teleconference (VTC).

8. The system of claim 1, wherein the door is locked to outsiders unless a proper level of security identification is provided.

9. The system of claim 8, further comprising:
an access interface located in the facility;
wherein the proper level of security identification is provided through the access interface.

10. The system of claim 9, wherein the proper level of security identification is provided by any of a key card, a security badge, a biometric identification, or verification by a lead participant.

11. The system of claim 8, further comprising:
a display located in the outer area, wherein the display is connected to the system controller; and
the controller includes instructions to display an alert with the display, wherein the alert includes any of an indication of a security level of an active meeting in the meeting space, or an indication that a meeting is in progress within the meeting space.

12. The system of claim 1, wherein the controller includes instructions to prevent the meeting space from becoming active for an intended function until all required security features are activated.

13. A method implemented with a controller having a processor, the method comprising:
receiving, at the controller, user initialized meeting parameters associated with a meeting space wherein, the meeting space is located within a facility;
receiving, at the controller, a sensor indication associated with a door of the meeting space;
determining, by the controller, a current status of the meeting space based on the received sensor indication;
comparing, by the controller, the current status of the meeting space to the user initialized meeting parameters; and
disabling, by the controller, one or more interface components related to the meeting space in response to the comparison.

14. A non-transitory computer readable medium having stored thereon a computer program having machine-readable instructions for performing, when running on a computer, steps comprising:
receiving user initialized meeting parameters associated with a meeting space;
receiving a sensor indication associated with a door of the meeting space;
determining a current status of the meeting space based on the received sensor indication;
comparing the current status of the meeting space to the user initialized meeting parameters; and
disabling one or more interface components related to the meeting space in response to the comparison.

* * * * *